(12) United States Patent
Kermani et al.

(10) Patent No.: US 7,382,274 B1
(45) Date of Patent: Jun. 3, 2008

(54) VEHICLE INTERACTION COMMUNICATION SYSTEM

(75) Inventors: Bahram Ghaffarzadeh Kermani, Whitehall, PA (US); Scott Wayne McLellan, Kempton, PA (US); Steven DeArmond Curtin, Freehold, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/489,467

(22) Filed: Jan. 21, 2000

(51) Int. Cl.
*G08G 1/00* (2006.01)
(52) U.S. Cl. ............... 340/901; 340/903; 340/905; 340/933; 340/435; 340/436
(58) Field of Classification Search ............ 340/901, 340/903, 905, 933, 435, 436
See application file for complete search history.

(56) References Cited

U.S. PATENT DOCUMENTS

| | | | | |
|---|---|---|---|---|
| 5,546,311 A | * | 8/1996 | Sekine | 340/902 X |
| 5,781,119 A | * | 7/1998 | Yamashita et al. | 340/903 |
| 5,875,518 A | * | 3/1999 | Walker | 15/46 |
| 6,032,097 A | * | 2/2000 | Iihoshi et al. | 701/96 |
| 6,084,510 A | * | 7/2000 | Lemelson et al. | 340/539.13 |
| 6,128,559 A | * | 10/2000 | Saitou et al. | 701/23 |
| 6,163,277 A | * | 12/2000 | Gehlot | 340/905 |
| 6,249,232 B1 | * | 6/2001 | Tamura et al. | 340/902 |
| 6,275,773 B1 | * | 8/2001 | Lemelson et al. | 701/301 |

(Continued)

FOREIGN PATENT DOCUMENTS

| | | |
|---|---|---|
| EP | 0 897 168 A2 | 2/1999 |
| GB | 2 250 169 A | 6/1992 |
| GB | 2 261 977 A | 6/1993 |
| GB | 2 349 000 A | 10/2000 |
| WO | WO98/25248 | 6/1998 |

OTHER PUBLICATIONS

Walter Buchignani, Complex relay of information can mean the difference between winning and losing, Montreal Gazette, Jun. 17, 2000.
McLaren's formula one race car paves the way unicenter TNG, Jun. 3, 2001.

*Primary Examiner*—Daryl C Pope (57) ABSTRACT

The information available to a driver of a vehicle is greatly expanded using wireless communications (e.g., using Bluetooth wireless communication devices). In one embodiment, information regarding an adjacent vehicle such as a brake light, a turn light, speed, distance, direction, etc., is transmitted from one vehicle to a nearby or adjacent other vehicle. The received information is used in any appropriate manner, such as causing the receiving vehicle to change vehicle speed or brake, to turn to avoid a collision, etc. In a second embodiment, roadside wireless transceivers collect information regarding passing vehicles, and central database is compiled relating to a traffic conditions. The traffic condition information can be passed back to the passing vehicles for appropriate use, e.g., causing the driver to slow down, or even causing a navigation device in the receiving vehicle to manually prompt for or automatically recalculate a best route to an intended destination. In yet another embodiment, broadcast transmitters can be established at signs and other significant locations transmitting information to passing vehicles. The broadcast information may be as simple as indicating the existence of the sign, or depending upon the range of the particular wireless transmitter, the existence of a particular sign, bump in road, curve, etc., can be forewarned far in advance of when the driver will actually see the relevant object. Alternatively, the broadcast information may be quite detailed, e.g., containing a detailed itemization and directions to a large number of gas stations, restaurants, etc., reachable from a particular exit from a highway.

21 Claims, 6 Drawing Sheets

U.S. PATENT DOCUMENTS 6,487,500 B2 * 11/2002 Lemelson et al. .......... 701/301
6,603,406 B2 * 8/2003 Jambhekar et al. ......... 340/905
6,813,561 B2 * 11/2004 MacNeille et al. ......... 701/213
6,864,784 B1 * 3/2005 Loeb .......................... 340/441

* cited by examiner

VEHICLE INTERACTION COMMUNICATION SYSTEM

BACKGROUND OF THE INVENTION

1. Field of the Invention

This invention relates generally to the improved safety of vehicles derived from wireless communications, either from vehicle to vehicle, and/or between a roadside device and a vehicle.

2. Background of Related Art

In today's vehicles, communications between automobiles is typically accomplished using visual confirmation of external signals (e.g., left turn signal light blinking, right turn signal light blinking, brake light illuminated, etc.) Imminent danger is often signaled by the use of an audible horn. While quite functional, the reception and accurate interpretation of visual and/or audible signals is dependent entirely on the awareness of the driver at the time that the signals are made. Unfortunately, the requirement for human interpretation and confirmation through visual (or audible) observation requires that a given separation be maintained between vehicles at any given speed to allow for a comfortable reaction time of the driver. Thus, visual confirmation of signals such as brake lights, of the separation between vehicles in front, behind, and to the sides of the vehicle, road signs, etc., are all subject to the accuracy and speed of human reaction. Any level of inattention can cause accidents in the worst case, or cause traffic jams in a collective case.

For instance, there may be times when a particular driver is not fully perceptive of the external environment surrounding the vehicle, and may as a result either become dangerously, close to other vehicles, and/or greatly increase the chances of their causing an accident.

As an example, a driver may not see or properly comprehend the intentions of a tailgating vehicle following too closely behind the driver's vehicle when the tailgating vehicle starts their left turn signal signaling their intention to pass in a left hand lane. The driver may not quickly assess such a situation, e.g., perhaps because of the ambiguity inherent with whether the following vehicle is making a left turn or intends to pass, perhaps because the driver's rear view mirror is not properly adjusted for the driver's current seated position, or because the driver is not constantly monitoring their rearview mirror, etc. In any event, the driver may in fact become startled by the appearance of the passing vehicle or worse yet unintentionally make a maneuver which interferes with the passing vehicle and causes an accident, increased separation between vehicles traveling on a common road to compensate for slower reaction time of the driver, and/or significant traffic problems particularly during work rush hours.

Not only is a driver subject to their own visual confirmation of signals from vehicles immediately surrounding their vehicle and their own reaction thereto, a driver may also be heading towards a heavy traffic situation without prior warning but for other visual confirmation (e.g., a visual road sign warning of traffic ahead), all of which add to the density and danger of vehicular travel in today's crowded and fast-paced world.

There is a need to improve the speed and accuracy of information to a driver regarding surrounding vehicles, objects, and/or traffic conditions, and to allow safer and more efficient use of roadways.

SUMMARY OF THE INVENTION

In accordance with the principles of the present invention, a vehicle interaction communication system comprises a wireless transmitter, and a digitized measurement of an operational aspect of a moving vehicle. A controller formats the digitized measurement and transmits the formatted digitized measurement using the wireless transmitter to a device external to a vehicle including the vehicle interaction communication system.

A method of communicating status information between moving vehicles in accordance with another aspect of the present invention comprises measuring an operational aspect of a first vehicle in operation on a roadway. A local area network is established including the first vehicle. The measured operational aspect is transmitted over the local area network.

A method of compiling real-time traffic data from moving vehicles in accordance with yet another aspect of the present invention comprises measuring internal vehicle data relating to an operational aspect of a vehicle in operation on a roadway from within a vehicle traveling on the roadway. A temporary network is established with a fixed transceiver. The measured internal vehicle data is transmitted to the fixed transceiver over the temporary network. The measured internal vehicle data is compiled from a plurality of vehicles as real-time traffic data.

Still another aspect of the present invention relates to a road mounted transmitter comprising a fixed value relating to a current speed limit. An RF transmitter transmits the fixed value to passing vehicles.

Another aspect of the present invention relates to apparatus comprising a vehicle, and a wireless communication system within the vehicle. The wireless communication system comprises a wireless transmitter, a digitized measurement of an operational aspect of a moving vehicle, and a controller adapted to format the digitized measurement, and transmit the formatted digitized measurement using the wireless transmitter to an external device.

A method of controlling a vehicle in accordance with yet another aspect of the present invention comprises establishing a local area network. An operational aspect of a vehicle is received over the local area network. A driver control of the vehicle is adjusted based on the received operational aspect of the vehicle.

A system for communicating with a passing vehicle on a roadway in accordance with another aspect comprises a wireless transmitter having an antenna in a vicinity of a roadway sign, and sign identification data for transmission by the wireless transmitter relating to information contained on the roadway sign.

A method for informing a moving vehicle regarding an approaching roadway sign in accordance with another aspect comprises establishing a local area network with an approaching vehicle, and transmitting information regarding information contained in a roadway sign which the vehicle is approaching.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates generally to the expansion of information available to a driver of a vehicle using wireless communications (e.g., using Bluetooth wireless communication devices). Information regarding surrounding vehicles (e.g., left turn, right turn, brake light, speed, direction, location) is brought directly into the compartment of the vehicle independent of the need for visual confirmation of the situation by the driver.

In one embodiment, a vehicle is equipped with a short-range communication system, e.g., Bluetooth, which communicates relevant status information with other nearby vehicles, which may include, but is not limited to, position (e.g., GPS), speed, direction, and/or status such as braking, measured slippage, acceleration, deceleration, direction of travel, etc.

Information regarding an adjacent vehicle such as a brake light, a turn light, speed, distance, direction, etc., may be transmitted from one vehicle to a nearby or adjacent other vehicle. The received information is used in any appropriate manner, such as causing the receiving vehicle to change vehicle speed or brake, to turn to avoid a collision, etc.

In a second embodiment, roadside wireless transceivers collect information regarding passing vehicles, and a central database compiles the received information and relates it to current, real-time traffic conditions. The real-time traffic condition information can be transmitted back to the passing vehicles while they are in range of the roadside wireless transceivers for appropriate use by the driven vehicle, e.g., causing the driver to slow down, or even causing a navigation device in the receiving vehicle to manually prompt for recalculation of, or automatically recalculate without prompting, a best route to an intended destination.

In yet another embodiment, broadcast transmitters can be established at signs and other significant locations transmitting data information to passing vehicles for display on a driver's console. The broadcast information may be as simple as indicating the existence of the sign, which would be particularly useful in a wooded or curvy portion of highway where the sign may be hidden due to overgrowth. Moreover, depending upon the range of the particular wireless transmitter, the existence of a particular sign, bump in road, curve, etc., can be forewarned far in advance of when the driver will actually see the relevant object. Still further, the information received could be checked against actual vehicle operation to check for driver compliance, and apply corrective action as necessary and/or desired. As an example, corrective action may include the application of brakes when the vehicle is approaching a curve or stop sign.

Alternatively, the broadcast information may be quite detailed, e.g., containing a detailed itemization and directions to a large number of gas stations, restaurants, etc., reachable from a particular exit from a highway. In such a case, a driver might scroll through a textual display of the received road data.

Figure 1:
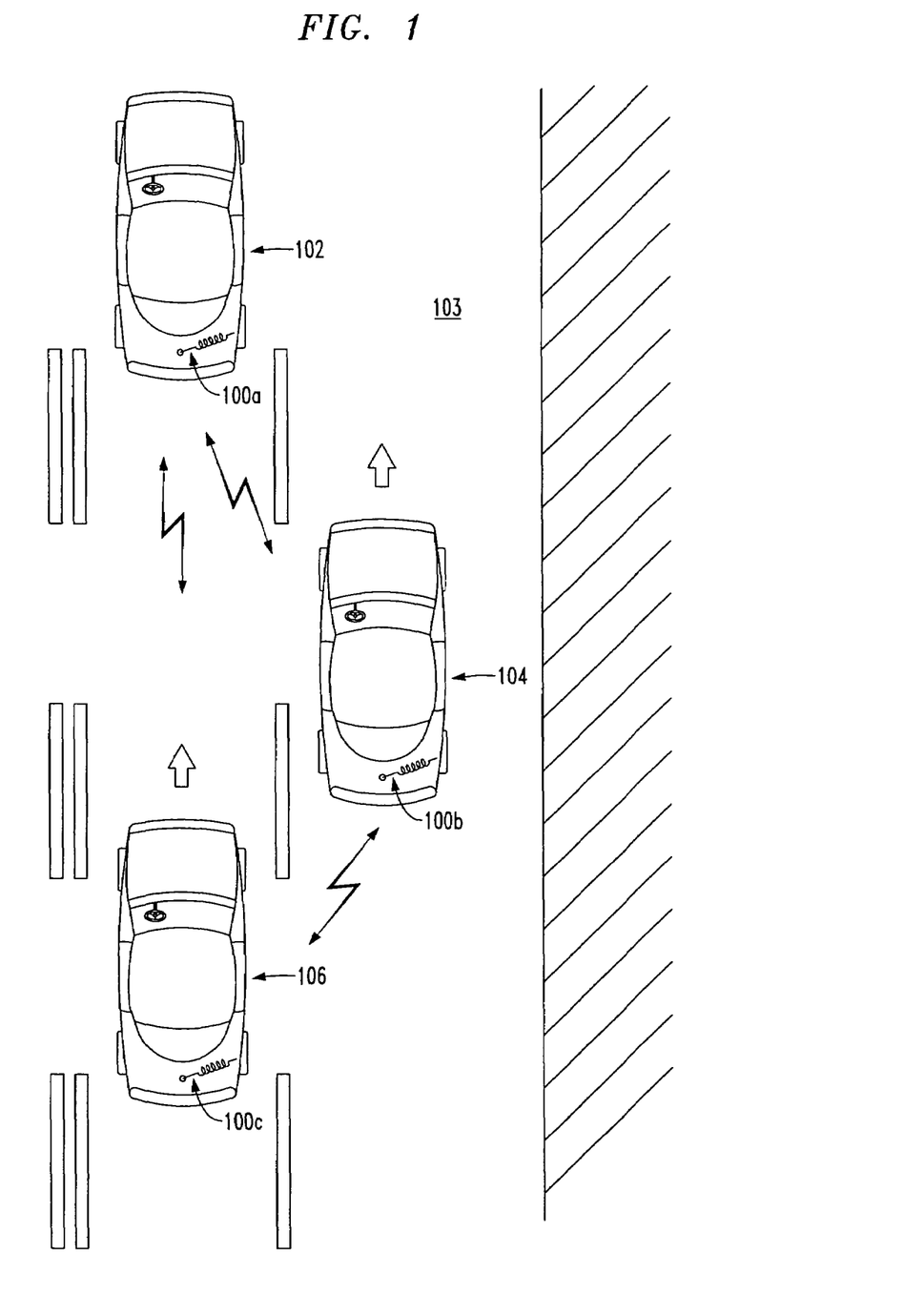
FIG. 1 shows a plurality of vehicles each equipped with a wireless vehicle interaction and control system to communicate status information regarding a transmitting vehicle, in accordance with the principles of the present invention.

FIG. 1 shows a plurality of vehicles each equipped with a wireless vehicle interaction and control system to communicate status information regarding a transmitting vehicle, in accordance with the principles of the present invention.

In particular, in FIG. 1, three vehicles 102, 104, 106 are shown traveling along a common roadway 103, and temporarily establish a wireless network using any appropriate wireless technology. For example, in the given embodiments, the three vehicles 102, 104, 106 form a local network, such as a piconet using Bluetooth protocols and technology. Of course, the principles of the present invention relate to any appropriate short or medium range wireless technology and/or protocols exchanged between moving vehicles.

Thus, in accordance with the principles of the present invention, Bluetooth or other short range RF communication systems are advantageously, but not necessarily, integrated with status and navigation sensing devices within each vehicle 102-106 and provide the sensed status information to the other appropriately equipped vehicles within range of the transmitting vehicle.

Preferably, the status information is updated and retransmitted periodically, e.g., every 1 second, every ½ second, etc., once the vehicle begins operation or when a condition in the vehicle changes, such as brake application, etc. The status information is transmitted to adjacent vehicles and/or objects within range of the transmitting vehicle.

Information about the Bluetooth wireless standard is occasionally revised, and can currently be obtained from the website www.bluetooth.com. Currently, the Bluetooth standard is a short range technology with a range of, e.g., 10-30 meters. However, longer range capabilities of this and other wireless standards are planned and applicable to the present invention.

Generally speaking, the longer the wireless range of the transmitting devices, the faster relative speeds between vehicles (or between a vehicle and an object) may be accommodated. For instance, with a 10-30 meter range, communications between vehicles traveling in a common direction along a common road and nearby stationary transceivers may be the most practical. However, using wireless transceivers in the vehicles with larger range communications, e.g., ½ kilometer, communications between passing vehicles is more practical as well as with stationary transceivers.

As shown in the given example of FIG. 1, two vehicles 102, 106 are traveling in a left hand lane, and a third vehicle 104 is traveling in a right hand lane. Each of the vehicles 102-106 include a wireless vehicle environment controller 100 in accordance with the principles of the present invention.

Figure 2:
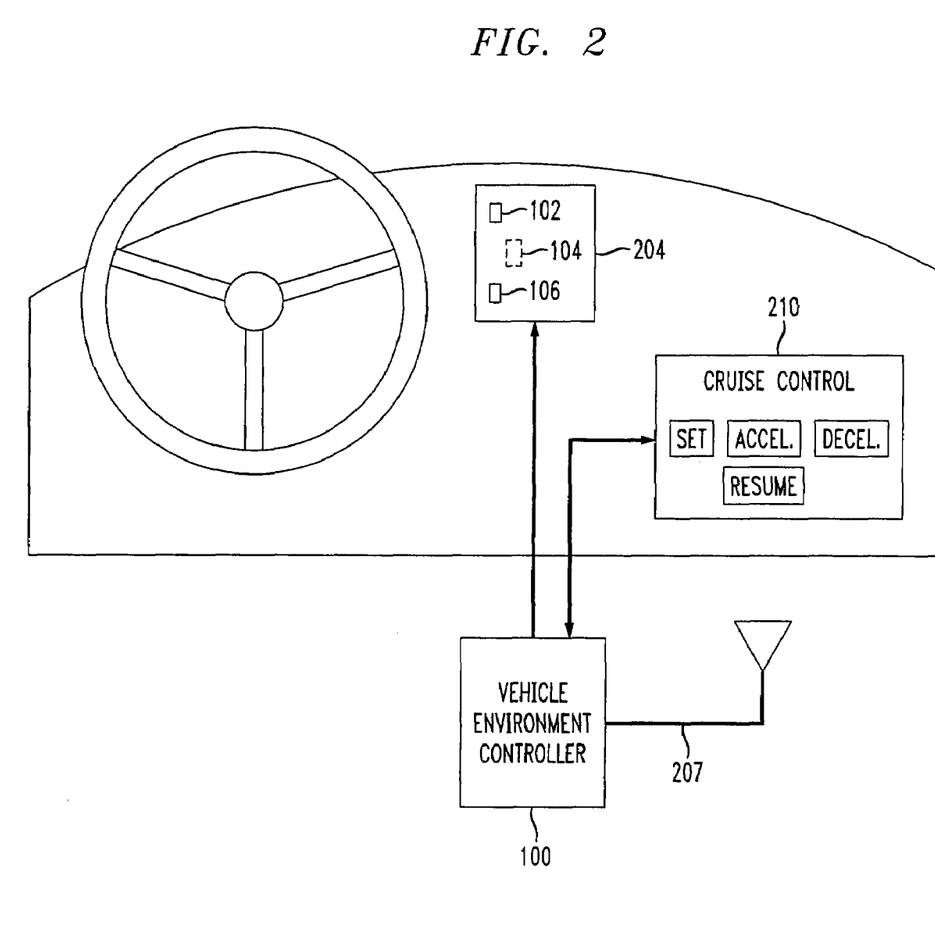
FIG. 2 is a depiction of the dashboard of any one of the vehicles including a vehicle environment controller and a vehicle interaction display, in accordance with the principles of the present invention.

FIG. 2 is a depiction of the dashboard of any one of the vehicles 102-106 including a vehicle environment controller 100 and a vehicle interaction display 204, in accordance with the principles of the present invention.

In particular, in FIG. 2, a wireless vehicle environment controller 100 includes a radio frequency (RF) transceiver front end including an antenna 207, an appropriate processor (e.g., a microprocessor, microcontroller, and/or digital signal processor (DSP)), and input/output signals to various sensing and/or control interfaces within the vehicle, including a display 204.

The display 204 may be graphical and/or textual in nature, but in any event desirably conveys (but is not essential to convey) status information received from an adjacent vehicle or object. As shown in FIG. 2, the display includes a graphical representation of the driven vehicle, with other vehicles 102, 106 within range and within the established local network (e.g. piconet) in appropriate positions with respect to the displayed image of the driven vehicle 104.

For instance, the display 204 shown in FIG. 2 may include a phantom of a vehicle behind, of a vehicle ahead, of a vehicle to the left, and of a vehicle to the right of the driver's vehicle, in moving relation to an image of the driven vehicle 104 in the center of the display. In response to the reception of a wireless signal (e.g., Bluetooth data) from any or all of the surrounding vehicles, the display of the drivers vehicle may be updated with a relative position of the relevant surrounding vehicle. Other information such as imminent collision, relative speed between vehicles, direction with respect to the driven vehicle, etc., can also be displayed.

Thus, as an example, if the driven vehicle receives Bluetooth data from a following vehicle indicating that it is exhibiting a left turn signal together with a closing distance and common direction, an appropriate processor (e.g., navigation system) in the driven vehicle can interpret such external actions as an intention to pass the driven vehicle, and can so indicate the same to the driver (either by visual display on a panel, on a heads-up display projected onto the windshield, by audible warning, etc.). Thus, the driver would be informed of a passing vehicle without having seen the vehicle themselves, either in the mirror or through a window.

In accordance with the principles of this aspect of the invention, aside from positional status information determined from, e.g., global positioning system (GPS) information relating to the transmitting vehicle, other status information may be displayed. For instance, the transmitting vehicle's speed, direction, acceleration, blinker status, braking status, etc., may additionally or alternatively be sensed by the transmitting vehicle, transmitted in data form using the Bluetooth RF transceiver from each of the vehicles, and displayed for the drivers of the in-range vehicles.

In a more sophisticated expansion of speed information transmitted to a surrounding vehicle, a new type of cruise control can be set to maintain the same actual speed of the preceding vehicle as received through Bluetooth data communications from the vehicle in front, instead of to a fixed speed as in conventional cruise control devices.

Figure 3:
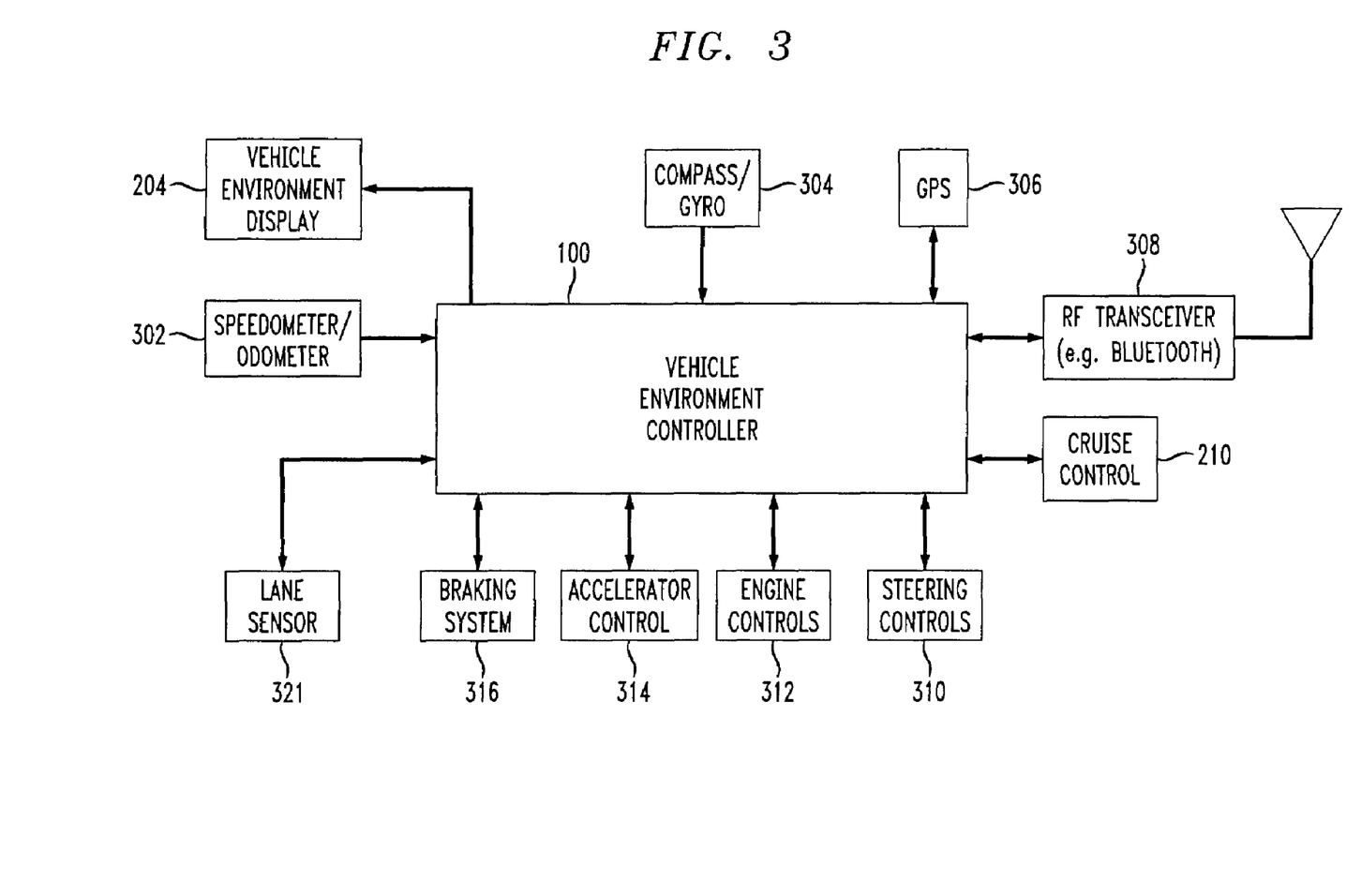
FIG. 3 shows a block diagram of exemplary sensing, control and data interfaces to a vehicle environment controller, in accordance with the principles of the present invention.

For instance, in accordance with the principles of the present invention, the status information from adjacent vehicles may be input to a cruise control device 210 in the driven vehicle 104. For instance, the speed of a forward vehicle in a same lane as the driven vehicle may be used to base the cruise-controlled speed of the driven vehicle 104 in a variable manner such that a constant distance is maintained between a car in front of the driven vehicle 104 and the driven vehicle 104 (rather than constant speed cruise control as in conventional vehicles). Further, the vehicle 104 may be fully controlled via steering controls 310, accelerator control 314, braking control 316, and engine controls 312, to provide safer vehicle (automatic) control. Using such automated cruise control, a driver's confidence and safety may be increased by providing a means other than simple visual observation and confirmation of changes in the forward vehicle's speed, causing an immediate change in spacing between the moving vehicles. In this way, more vehicles may be packed into a given stretch of highway with smaller (yet safer) separation between each vehicle, still maintaining a same given level of safety because as a lead vehicle brakes, so too will a following vehicle using the automated cruise control 210.

Detailed position information can also be provided, e.g., information relating to which lane is being occupied, as can vehicle performance information.

Using the vehicle environment controller 100 in accordance with the principles of the present invention, vehicles can interact with one another to achieve a specific goal. The specific goal can be, e.g., best speed, high density, or other desired result.

In addition to general traffic flow information, emergency causing information and control may also be accomplished. For instance, information regarding braking communicated between vehicles would allow vehicles in a vulnerable position (e.g., behind or to the side of the braking vehicles) to be immediately informed of the braking status, allowing a quick reaction by the driver of the affected vehicle to compensate or apply emergency braking (based on acceleration data) to maintain a desired separation between vehicles.

Because of the short range nature of low power wireless communications systems, such as Bluetooth, multiple mobile local networks between vehicles can be implemented to convey accurate, current road and traffic conditions to, e.g., rearward vehicles or to opposing traffic.

Inter-vehicle, short range, voice communication can also be provided. For instance, the Bluetooth wireless communication protocol includes capability for the transmission of audio. Thus, using the audio capability and appropriate analog-to-digital and digital-to-analog conversion circuitry, and appropriate encoding and decoding algorithms as desired in the vehicles, voice communications can be supported between two vehicles certainly within a single local network, and even between two separate vehicles via an appropriate local network bridging device between two separate local networks.

Other advances can be made in vehicle safety given the wireless communication (e.g., a piconet such as Bluetooth) between vehicles as they become within range of one another on a particular road. For instance, the speed of a surrounding vehicle can be transmitted to other vehicles in range, to allow a driver to adjust their speed accordingly. In a simpler case, acceleration or deceleration information regarding the vehicle in front, either in absolute terms and/or relative to the driver's vehicle, can be indicated, e.g., using an UP arrow (accelerating) or DOWN arrow (decelerating).

FIG. 3 shows a block diagram of exemplary sensing, control and data interfaces to a vehicle environment controller 100, in accordance with the principles of the present invention.

In particular, as shown in FIG. 3, various input/output devices are interfaced with the vehicle environment controller 100, which receives and transmits status data regarding interacting vehicles within range of one another through a radio frequency (RF) transceiver 308.

For instance, various devices within the driven vehicle can be sensed, with a digital output being formatted using an appropriate protocol (e.g., Bluetooth) and transmitted using an RF wireless transmitter to all other vehicles within range. Exemplary devices for sensing include a speedometer and/or odometer 302, a global positioning system (GPS) 306, often comprised within a navigational system in the driven vehicle. A compass and/or gyroscope and acceleration (inertial navigation system) may be included as an alternative to the GPS 306, to provide useful information to adjacent or otherwise in-range vehicles.

The GPS 306 may be included within the transmitting vehicle to provide exact location, direction and speed information. GPS information may also or alternatively be used to calibrate any inertial navigation systems.

Status data received from other vehicles within the piconet (and/or from roadside transceivers) can be appropriately displayed on a display 204 (and/or audibly provided to the driver).

As described above, the speed of a cruise control system 210 can be controlled in a variable fashion using speed information received from a vehicle in front of the driven vehicle.

For safety purposes, critical controls of the vehicle may be overridden as determined by the vehicle environment controller 100. For instance, the braking system 316, the accelerator control 314, and/or other engine controls 312, and even steering controls 310 may be enabled, disabled, or even variably controlled, based on information received from other vehicles.

A radar device may be included to allow a desired separation distance between fore/aft and/or side/side vehicles. The radar device may be of the traditional RF type. Alternatively, a Bluetooth transponder may be utilized to allow the measurement of round-trip delay times or received signal strength indicator (RSSI) of the return signal to provide rudimentary ranging information in lieu of a radar system.

Figure 4:
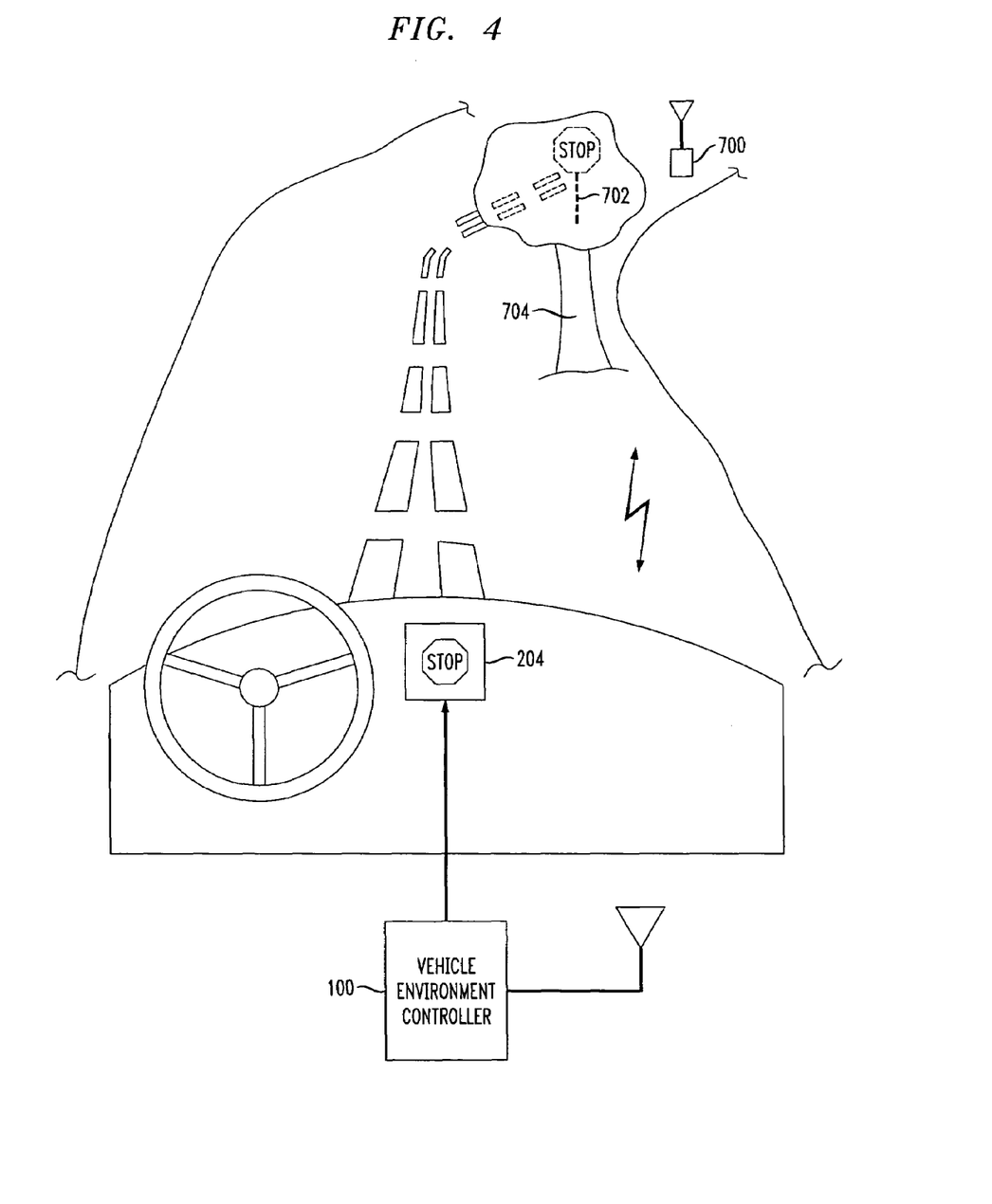
FIG. 4 shows implementation of a broadcast wireless data transmitter at strategic locations along a road (e.g., corresponding to stop signs, traffic signals, etc., temporarily establishing a piconet with an approaching vehicle, in accordance with the principles of the present invention.

FIG. 4 shows implementation of a broadcast wireless data transmitter at strategic locations along a road (e.g., corresponding to stop signs, traffic signals, etc., temporarily establishing communication with an approaching vehicle, in accordance with the principles of the present invention.

A simple use of Bluetooth communications in vehicular use is the communication of simple directional or sign information transmitted from a stationary roadside transmitter to passing vehicles when they become within range.

For instance, there are times at which ambient or environmental conditions (e.g., fog, nighttime, tree growth obstructing the sign, faded sign, etc.) cause difficulty in the visual confirmation of a particular sign, road curve, etc. In accordance with this aspect of the present invention, critical signs, road aspects, objects, locations, etc., can be equipped with appropriate wireless short range broadcast transmitters (e.g., Bluetooth transmitters), and repeatedly output data relating to the relevant information (e.g., a stop sign ahead, turn ahead, reduced speed, etc.)

In particular, as shown in FIG. 4, a vehicle including a vehicle environment controller 100 including an RF receiver, and a display 204 is shown approaching a stop sign 702 totally obstructed by a tree 704. Ordinarily, the driver of the vehicle might not actually observe the stop sign until they turn the corner around the tree 704. However, in accordance with the principles of the present invention, data transmitted by an appropriately placed Bluetooth (or other protocol) RF transmitter 700 is received, processed, and provided to the driver using, e.g., a display of a stop sign, textually indicating "stop sign", or other technique in the driven vehicle.

As another example, a wireless data transmitter may be associated with a speed limit sign. The wireless data transmitter may be placed in a broadcast mode for reception by any/all approaching and passing vehicles.

The speed limit information may be digitally received by approaching or passing vehicles, and referred to at the driver's pleasure. For instance, if the driver was not cognizant of the last approached speed limit sign as it was passed, the speed limit information may be retained by the vehicle and presented to the driver when the driver is requiring such information.

The speed limit information retained by the vehicle may be refreshed by new speed limit signs as they are passed.

In operation, the wireless data transmitter may be set near a speed limit sign. Then, a particular speed limit of a roadway on which a vehicle is traveling may be digitally received by the vehicle as it approaches and passes a particular broadcast wireless data transmitter. The digitally received speed limit may be displayed in the vehicle for the driver's reference.

Moreover, the digitally received speed limit may be the basis for a derivative display. For example, the difference between a current rate of speed of the approaching or passing vehicle and the relevant speed limit for that stretch of roadway digitally received by the approaching or passing vehicle may be displayed for the driver's reference.

The difference between the current rate of speed may be used to control a governor which limits the rate of speed of the vehicle. Thus, automatic control of acceleration may be gained as a vehicle travels over various roadways having differing speed limits.

Further advances may allow any driver control (e.g., braking, acceleration, steering, blinker activation, horn activation, etc.) to be automatically adjusted based on information received over a wireless network, in accordance with the principles of the present invention.

Figure 5:
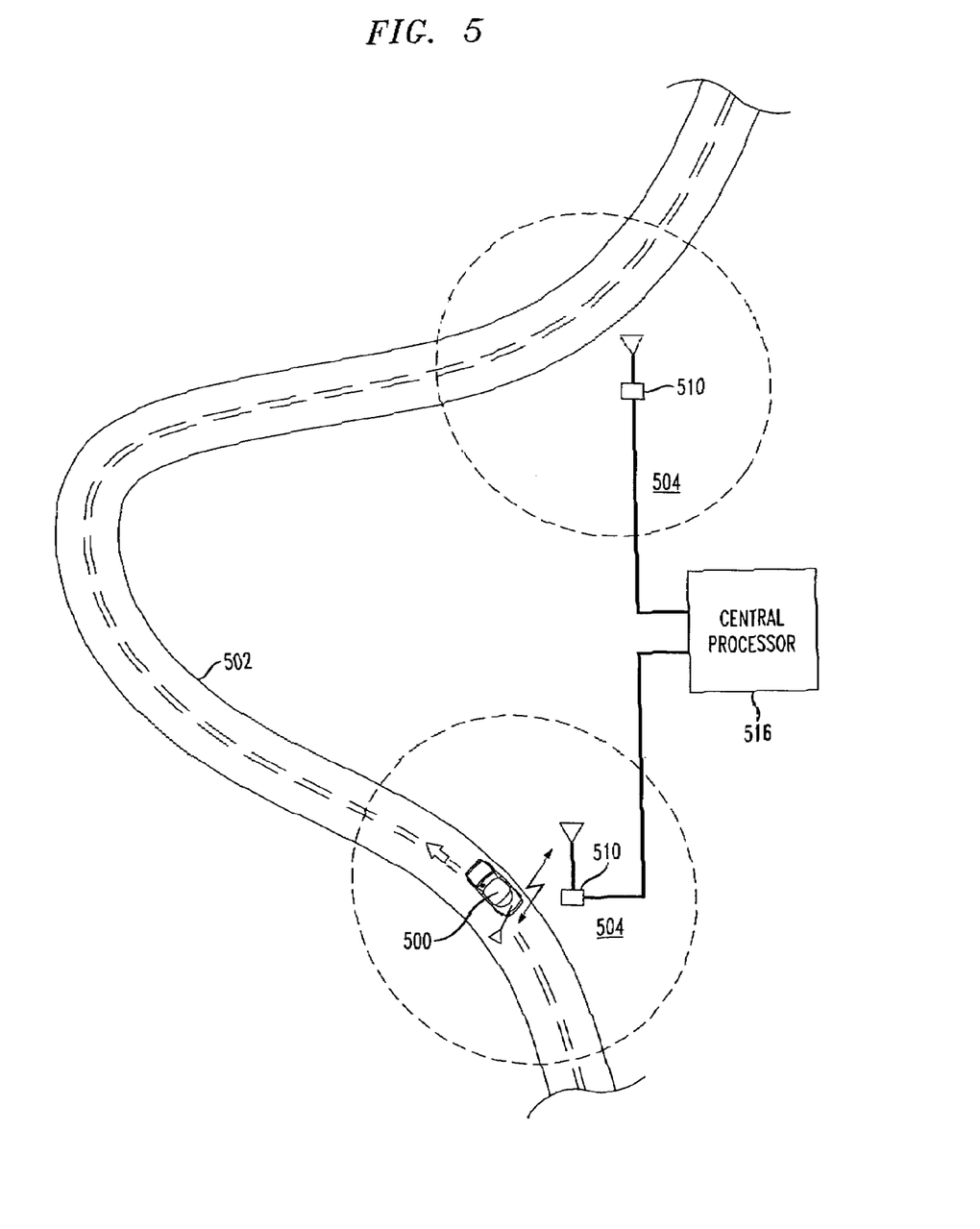
FIG. 5 shows a traffic flow coordination system utilizing Bluetooth transponders at various checkpoints along a road system, in accordance with the principles of the present invention.

FIG. 5 shows a traffic flow coordination system utilizing transponders at various checkpoints along a road system, in accordance with the principles of the present invention.

Short range transceivers along roadway can collect detailed vehicle status information from traveling vehicles, to provide traffic data back to traveling vehicles.

Exemplary status information includes, but is not limited to, lane, road, location, distance information. Exemplary transponder communication information includes, e.g., information regarding the steered direction of a querying vehicle as it approaches or recedes from the embedded lane marker.

For instance, roadside transceivers may query passing vehicles for status information, e.g., speed, direction, route, etc., and compile the same in a traffic database or other information compilation.

A centralized computer can collect all information from the passing vehicles to determine actual traffic conditions for relevant roadways.

The traffic information determined directly from passing vehicles can be fed back to the same or other traveling vehicles, with suggestive or automated navigation control information.

For instance, a navigation system in a passing vehicle may utilize the received traffic information to determine automated control information for aspects of the vehicle, e.g., to limit a maximum speed of the vehicle, or to provide speed adjustment data and/or alternative directions to a destination, to maintain a smooth traffic pattern.

Also, information passed to the vehicles may relate to the suggestion of an alternative route to be taken by the vehicle, with or without mandating specific maximum speeds or other aspects of the vehicle.

Such a navigation system aids in the administration of traffic flow, avoids the formation of traffic jams, and/or has the capability to route traffic away from problem areas.

The roadside transceivers can also provide warning information to vehicles regarding approaching and overtaking emergency vehicles, so that the vehicles may more readily be informed of the approaching emergency vehicle and yield to the oncoming emergency vehicle at an earlier time.

The roadside transceivers can also or alternatively provide a data download of traffic information to resident navigational computers inside vehicles, prompting the navigational computers to recalculate a best route to the desired destination given the current or expected traffic conditions. Alternatively, a centralized computer system can calculate the best route (e.g., shortest time, shortest distance, best views, etc.) for a particular vehicle in view of the overall traffic 'picture'.

In accordance with the principles of this aspect of the present invention, vehicles can adapt quickly to the state of nearby vehicles.

Figure 6:
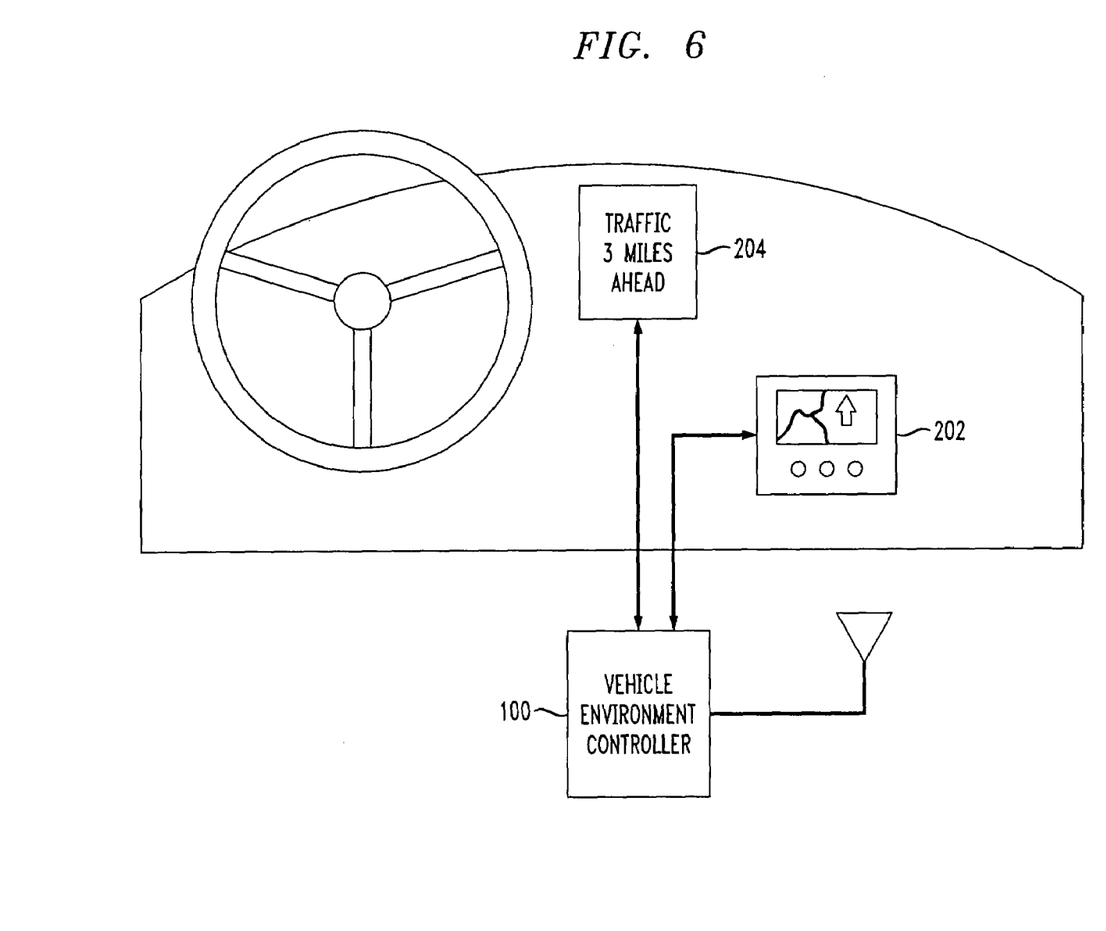
FIG. 6 shows the integration of traffic information received by a vehicle environment controller with a navigational control system to cause, e.g., recalculation of a best route to an intended destination based on real-time traffic conditions including the driven vehicle, in accordance with the principles of the present invention.

FIG. 6 shows the integration of traffic information received by a vehicle environment controller 100 with a GPS navigational control system 202 to cause, e.g., recalculation of a best route to an intended destination presented by the GPS navigational control system 202 based on real-time traffic conditions including the driven vehicle received from a roadside transponder, in accordance with the principles of the present invention.

In addition, a navigation computer in the vehicle can be responsive to signals received from lane markers embedded in a roadway being traveled. The embedded lane markers may be passive devices which provide indication to the vehicle as to the relationship to the appropriate lane of roadway.

The embedded lane markers may be, e.g., optical devices and/or reflective devices sensed by an appropriate light source and/or detector mounted on the vehicle. In another embodiment, the embedded lane markers may be, e.g., electromagnetic devices which output a particular signal in response to an electromagnetic stimulation output by the vehicle as it passes.

The embedded lane markers may be sensed by an appropriate lane sensor 321 (FIG. 3) in communication with the vehicle environment controller 100. The relationship of the vehicle with respect to the lane as determined by the lane sensor 321 may be used to keep the vehicle within the bounds of the lane and/or appropriately distant from adjacent vehicles.

Control of vehicle navigation in accordance with this aspect of the present invention provides for a more efficient regulation of traffic flow.

While the invention has been described with reference to the exemplary embodiments thereof, those skilled in the art will be able to make various modifications to the described embodiments of the invention without departing from the true spirit and scope of the invention.

What is claimed is:

1. A vehicle safety system, comprising:
   a wireless piconet transmitter to transmit a piconet signal to a second vehicle;
   a measurer to measure at least one of a round-trip delay time of said piconet signal between said first vehicle and said second vehicle, and a received signal strength indicator (RSSI) from said second vehicle; and
   a rudimentary ranging information determiner to determine rudimentary ranging information from at least one of said round-trip delay time and said RSSI.

2. The vehicle safety system according to claim 1, wherein:
   at least one of a braking system, an accelerator control, and a steering control are at least one of enabled, disabled, and variably controlled based on said rudimentary ranging information.

3. The vehicle safety system according to claim 1, wherein:
   a current speed of said first vehicle is adjusted based on said rudimentary ranging information.

4. The vehicle safety system according to claim 1, wherein:
   said rudimentary ranging information allows a determination of a current direction of said second vehicle.

5. The vehicle safety system according to claim 1, wherein:
   said rudimentary ranging information allows a determination of a desired fore and aft separation distance between said first vehicle and said second vehicle.

6. The vehicle safety system according to claim 1, wherein:
   said rudimentary ranging information allows a determination of a desired separation distance between a side of said first vehicle and a side of said second vehicle.

7. The vehicle safety system according to claim 1, wherein:
   a cruise control system is controlled in a variable fashion using said rudimentary ranging information.

8. A method of maintaining safety between vehicles, comprising:
   transmitting a piconet signal to a second vehicle;
   measuring at least one of a round-trip delay time of said piconet signal between said first vehicle and said second vehicle, and a received signal strength indicator (RSSI) from said second vehicle; and
   determining rudimentary ranging information from at least one of said round-trip delay time and said RSSI.

9. The method of maintaining safety between vehicles according to claim 8, wherein:
   at least one of a braking system, an accelerator control, and a steering control are at least one of enabled, disabled, and variably controlled based on said rudimentary ranging information.

10. The method of maintaining safety between vehicles according to claim 8, wherein:
    a current speed of said first vehicle is adjusted based on said rudimentary ranging information.

11. The method of maintaining safety between vehicles according to claim 8, wherein:
    said rudimentary ranging information allows a determination of a current direction of said second vehicle.

12. The method of maintaining safety between vehicles according to claim 8, wherein:
    said rudimentary ranging information allows a determination of a desired fore and aft separation distance between said first vehicle and said second vehicle.

13. The method of maintaining safety between vehicles according to claim 8, wherein:
    said rudimentary ranging information allows a determination of a desired separation distance between a side of said first vehicle and a side of said second vehicle.

14. The method of maintaining safety between vehicles according to claim 8, wherein:
    a cruise control system is controlled in a variable fashion using said rudimentary ranging information.

15. Apparatus for maintaining safety between vehicles, comprising:

means for transmitting a piconet signal to a second vehicle;

means for measuring at least one of a round-trip delay time of said piconet signal between said first vehicle and said second vehicle, and a received signal strength indicator (RSSI) from said second vehicle; and means for determining rudimentary ranging information from at least one of said round-trip delay time and said RSSI.

16. Apparatus for maintaining safety between vehicles according to claim 15, wherein:

at least one of a braking system, an accelerator control, and a steering control are at least one of enabled, disabled, and variably controlled based on said rudimentary ranging information.

17. Apparatus for maintaining safety between vehicles according to claim 15, wherein:

a current speed of said first vehicle is adjusted based on said rudimentary ranging information.

18. Apparatus for maintaining safety between vehicles according to claim 15, wherein:

said rudimentary ranging information allows a determination of a current direction of said second vehicle.

19. Apparatus for maintaining safety between vehicles according to claim 15, wherein:

said rudimentary ranging information allows a determination of a desired fore and aft separation distance between said first vehicle and said second vehicle.

20. Apparatus for maintaining safety between vehicles according to claim 15, wherein:

said rudimentary ranging information allows a determination of a desired separation distance between a side of said first vehicle and a side of said second vehicle.

21. Apparatus for maintaining safety between vehicles according to claim 15, wherein:

a cruise control system is controlled in a variable fashion using said rudimentary ranging information.

\* \* \* \* \*